Figure 1:
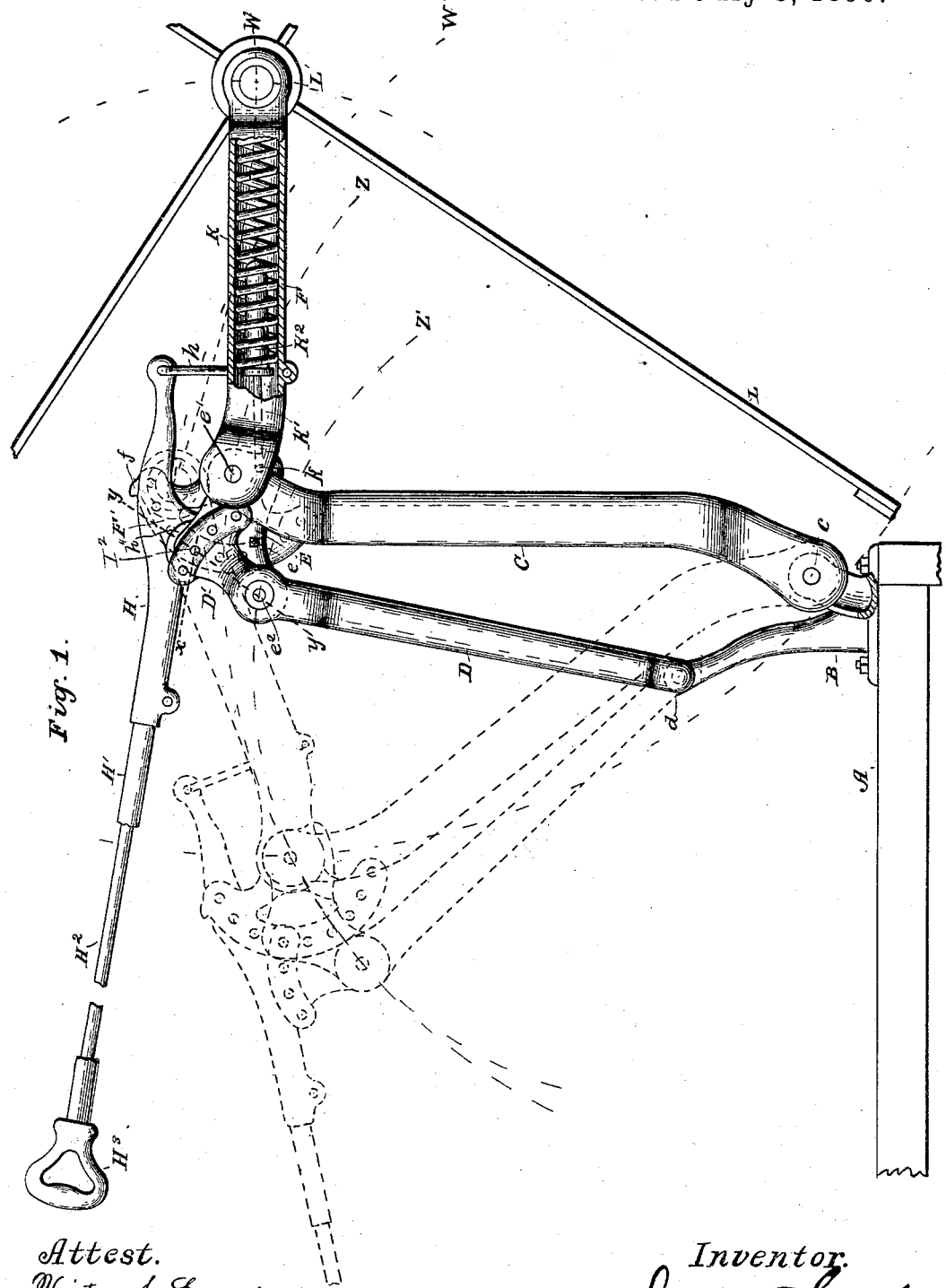

(No Model.)   3 Sheets—Sheet 1.

J. A. GRAHAM.
HARVESTER REEL SUPPORT.

No. 431,970.   Patented July 8, 1890.

Attest.
Victor J. Evans.
Louis Evans.

Inventor.
James A. Graham (No Model.) 3 Sheets—Sheet 2.
J. A. GRAHAM.
HARVESTER REEL SUPPORT.
No. 431,970. Patented July 8, 1890.
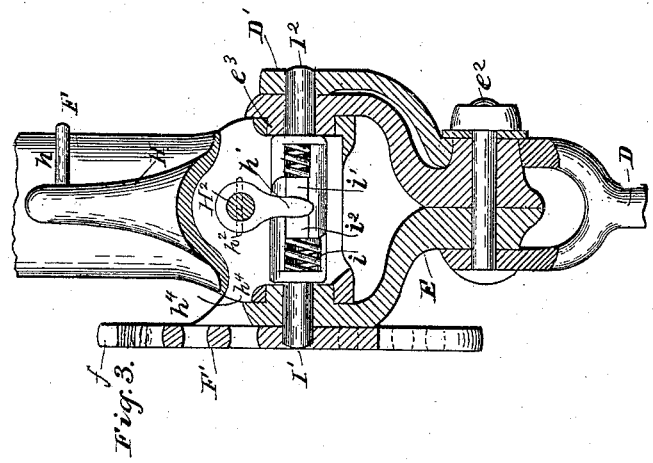
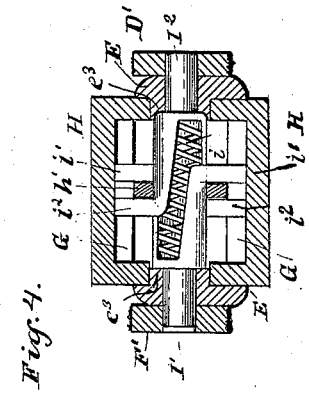
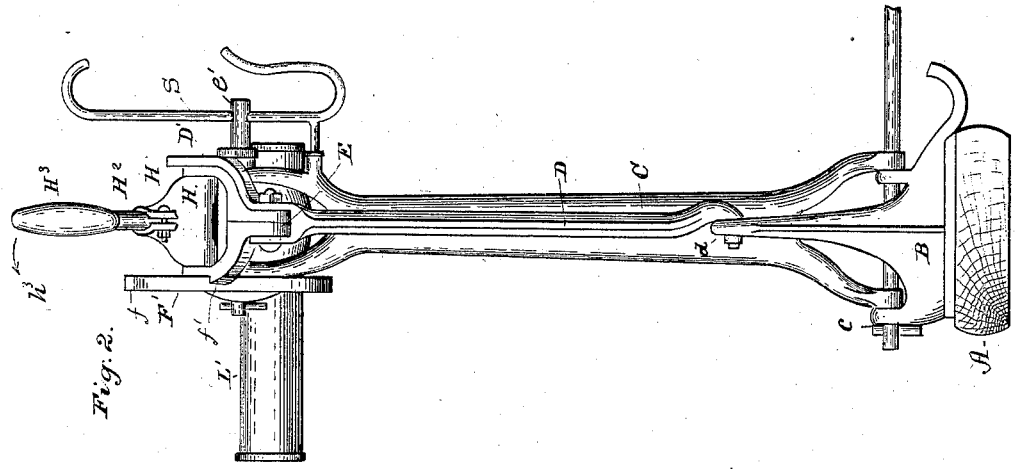
Attest.
Victor J. Evans.
Louis Evans
Inventor.
James A. Graham (No Model.)
3 Sheets—Sheet 3.
J. A. GRAHAM.
HARVESTER REEL SUPPORT.
No. 431,970.
Patented July 8, 1890.
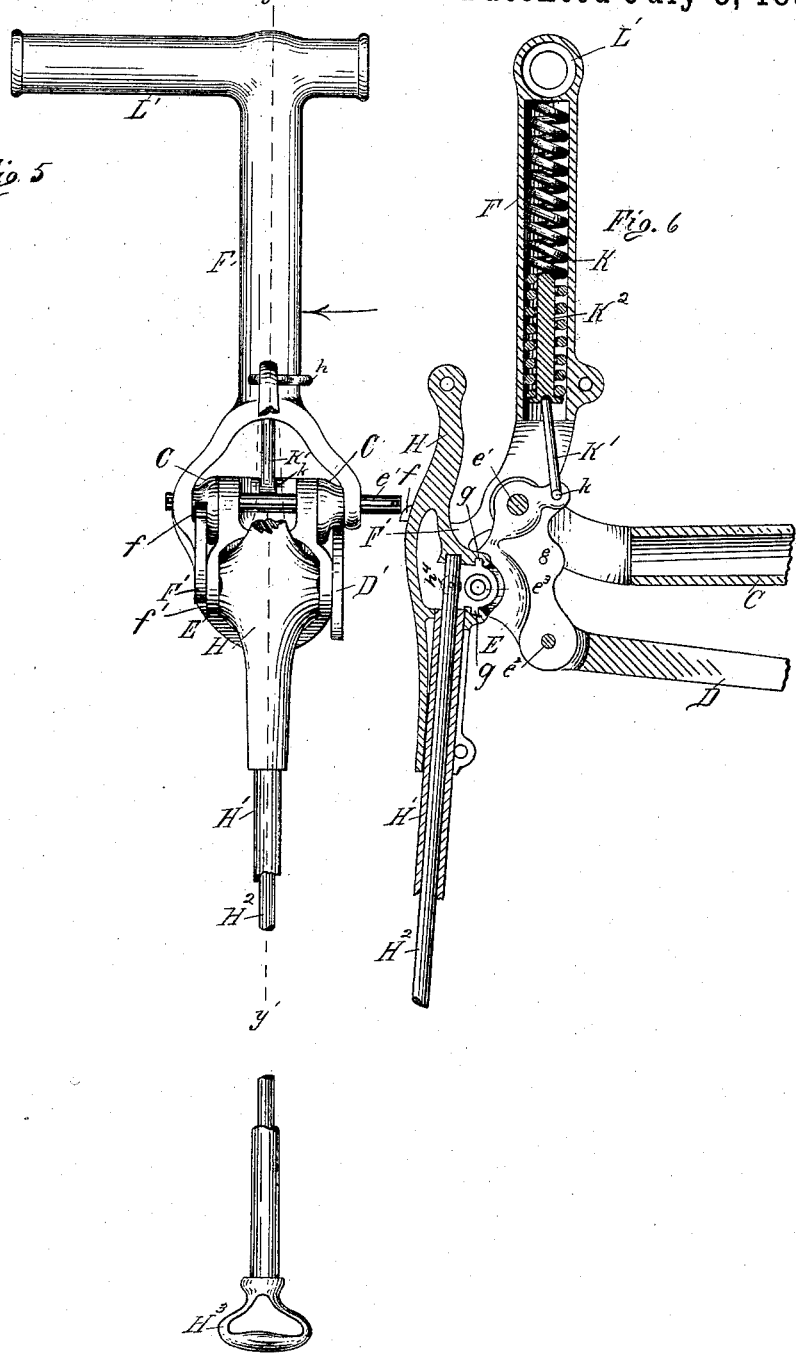
Witnesses:
Inventor:
James A. Graham
per M. M. Burson
his Attorney.

UNITED STATES PATENT OFFICE.

JAMES A. GRAHAM, OF MILWAUKEE, WISCONSIN, ASSIGNOR TO THE MILWAUKEE HARVESTER COMPANY, OF SAME PLACE.

HARVESTER-REEL SUPPORT.

SPECIFICATION forming part of Letters Patent No. 431,970, dated July 8, 1890.

Application filed February 27, 1889. Serial No. 301,326. (No model.)

*To all whom it may concern:*

Be it known that I, JAMES A. GRAHAM, a citizen of the United States, residing at Milwaukee, in the county of Milwaukee and State of Wisconsin, have invented certain new and useful Improvements in Harvester-Reel Supports; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in harvester-reel supports; and the objects of my invention are, first, to provide for the adjustment of an adjunctive part of a harvester or similar machine, a lever with a locking device, the latter arranged to be operated by an axial movement of said lever and to make a support for harvester-reels with connected parts, by means of which the driver from his seat may easily adjust it to suit the condition of the grain; second, to provide a reel-support in which the weight of the reel is balanced by a spring when being adjusted upward and downward, and, third, to furnish improved devices for controlling the support and adjustments of the reel, as hereinafter shown. I attain these objects by the mechanism illustrated in the accompanying drawings, in which—

Figure 1 is a side elevation of the reel-support, part being broken away. Fig. 2 is a rear elevation. Fig. 3 is a section on line $y$ $y$, Fig. 1. Fig. 4 is a section on line $x$, Fig. 1, looking downward. Fig. 5 is a plan view of the reel-support, certain parts being omitted the better to show others. Fig. 6 is a vertical section of the parts shown in Fig. 5 on the line $y'$ $y'$, omitting plunger-pins and fingers $h'$.

In the drawings, A is a part of the harvester-frame on which is fastened the base-support piece B. The upright arm C is pivoted to the base-piece B on rod $c$, and some distance rearward and at a greater height the brace-arm D is pivoted to the same piece at $d$. The upper end of arm C is pivoted on rod $e'$ to the coupling E, and the upper end of brace D is in like manner connected with coupling E at $e^2$. The reel-bearing arm F is hinged upon rod $e'$ to arm C and coupling E. The hand-lever H is pivoted upon inwardly-projecting bosses $e^3$ $e^3$ on coupling E. The reel L is held in a sleeve formed on the forward end of arm F, and is of such form of construction and driven in such manner as may be desired. The brace D terminates at its upper end in the sector D' concentric with pivot $e^2$. This sector has at suitable intervals holes to receive the end of plunger-pin I$^2$. Arm F has upon its forward end the reel-bearing sleeve L', and upon its rearward end on the side opposite to sector D' when placed in position the sector F' concentric with rod $e'$. In this sector are holes to receive the plunger-pin I'. These sectors both traverse the center of the hinge of lever H, (see Fig. 1, full and dotted lines,) and hence can always be brought into engagement with the plunger-pins I' I$^2$, which are placed in the line of such center, Figs. 3 and 4.

The coupling-piece E is preferably made in two parts, divided on the median line and held together by a bolt at $e$. Its upper sides are bent outward, so that lever H is pivoted on bosses $e^3$ $e^3$ on its inner surfaces. These bosses are hollow and provide bearings for the ends of the plunger-pins I' I$^2$. The forward end of hand-lever H is connected to arm F by the rod $h$. I prefer to make the hand-lever of a cast part, which furnishes a support for the plunger-pins I' I$^2$ and has an extension reaching to the driver, consisting of a hollow pipe H', on which is the rod H$^2$, on the rear end of which is the handle H$^3$, and on its forward end are fastened the cam-like fingers $h'$ $h'$ by pin $h^2$, inserted through holes $h^4$ of handle, which operate the plunger-pins I' I$^2$ by turning handle H$^3$. When used in this description to indicate the general operation of the lever, the parts just described will be called the "hand-lever." This construction of the hand-lever gives strength with lightness and provides a good bearing for the plunger-pins I' I$^2$, as also for their operating-rod H$^2$, Figs. 1, 3, and 4. The locking device of this reel-support consists of the plunger-pins I' I$^2$, held in the handle H and in the bosses $e^3$ $e^3$ of coupling E and the sectors D' F', Figs. 3 and 4. The plunger-pins I' I² are made with a projecting lug on each side, (marked, respectively, i' i' for plunger-pin I' and i² i² for plunger-pin I²,) and are formed with a recess, in which is placed a coiled spring to hold the pins in their sectors. The plungers reach past each other and have their lugs at their inner ends, and the operating cam-fingers h' h' enter between the said lugs and operate to withdraw the pins from engagement with the sectors when handle H³ is turned. These operating-lugs move in the guide-grooves G G in handle H, Fig. 4. Arm F, one side of which is shown broken away in Fig. 1, is preferably made hollow to provide a convenient case for the coiled open spring K. Against the rear end of this spring is the flange of cup K², which receives the forward end of rod K', the rear end of which connects with coupling E at $k$, Fig. 1. The curved-line guide S is conveniently attached to arm C and rod $e'$, as shown, Fig. 2, and operates to keep the lines out of contact with the driving mechanism and reel.

The operation of my reel-support is as follows: When handle H³ is turned in the direction of the arrow $h^3$, the plunger-pin I' is withdrawn from the sector F', and the reel can be raised or lowered, as desired, by the lever H acting on arm F through the bent rod $h$. While this adjustment is being made plunger-pin I² holds coupling-piece E rigid with arm C and brace D. By reference to Fig. 1 it will be seen that the reel-arm F cannot be lowered without compressing spring K, and hence is supported on said spring while being adjusted up and down, relieving the operator from holding the weight of the reel by the hand-lever while making such adjustment. The location of the point of connection between spring K or rod K' and piece E at $k$, below and somewhat in advance of hinge $e'$, compensates in part to give the spring a uniform resistance to the weight of the reel. When the handle is turned in the opposite direction, plunger-pin I' is driven into one of the holes in sector F' by the coiled spring $i$ and plunger-pin I² is withdrawn from sector D', and the reel is moved foward and backward by the handle H³ on the line W, Fig. 1. The stop $f$ on sector F' limits the forward movement of the reel-support by contact with stop $f'$ on coupling E, Figs. 2 and 5. By comparing this line W with line W' the advantages of the action of the brace D and coupling E will be understood. When pin I² is withdrawn from sector D', coupling E is held rigid with arm F by pin I' in sector F', so that they operate as one piece, and the brace D, being shorter than arm C, and both being hinged to piece E, will relatively depress the rear end of said coupling-piece, and hence raise the forward end and with it supporting-arm F and the reel. The principal weight to be supported in this system is the reel, and such an arrangement and proportioning of the parts as gives it a horizontal movement would keep it in equilibrium in its forward and backward movements, were it not for the reel-supporting mechanism. To counteract the tendency of this mechanism to overturn or fall down, the members of the support are so proportioned that the reel in moving either forward or backward from its position of rest shall describe a line slightly curved upward, just sufficient to overcome the weight of the support, and the reel is thereby moved forward and backward in equilibrium, and will stop in any position without locking and without tendency to fall downward.

The dotted line W indicates the line of movement of the reel-center in its forward and backward adjustment, which, it is observed, is nearly horizontal. Line W' is a true circle struck from the pivot $c$, upon which the upright arm C vibrates through the center of the reel, and indicates the line of movement of a reel supported upon a single pivot. Line Z is struck from the pivot $c$ of arm C through the hinge-pivot $e'$, which connects arm C with piece E, and is a true circle from said center. Line Z' is struck from the pivot $d$ of brace D, upon which it is connected to the base-piece B through hinge $e^2$, which connects said brace with coupling E.

By comparing the line Z, representing the line of movement of the forward end of the coupling-piece E, with line Z', representing the movement of the rearward end of the same piece, it is seen that the forward end of piece E is relatively raised in adjusting the reel forward, and that the line W, described by the reel in its forward and backward movement, is practically horizontal, inclining slightly upward in each direction from the central position, and hence that in the forward and backward adjustment of the reel it is practically balanced without regard to the spring K, which does not act at all in such adjustments. This balancing of the reel in its forward and backward adjustment is effected by properly proportioning the relative length of the supporting-arm C and that of brace D, as also in the due placing of the positions of their pivotal connections with the base B and hinge-connection with coupling E. It is thus seen that all the adjustments of the reel are controlled by a single lever, which is short and easily kept in reach of the driver, and that it is balanced in its forward and backward adjustments by making its supporting parts of proper proportions, and that it is balanced in its vertical movement by the interposed spring K.

Various modifications can be made in these devices without departing from the scope of my invention.

What I claim is—

1. In a harvester or similar machine, the combination, with an adjunctive part of the machine adjustably connected therewith, of an adjusting-lever connected with and serving to adjust said adjunctive part, and a locking device by which said lever and adjunctive parts are held in definite positions, said lever being provided with a handle at a right angle, or nearly so, to its axis and given an axial movement of said lever, adapted alone to operate both the locking device and the adjustable parts, substantially as and for the purpose set forth.

2. In a harvester, the combination of a reel-support pivoted at its lower end to the frame of the machine, a reel-bearing arm pivoted to said support, so as to be movable forward and backward, an adjusting-lever capable of turning on an axis transverse to its fulcrum, and a locking device arranged to hold said reel-bearing arm in a determinate position with reference to said forward and backward movement and to be operated by the axial movement of said lever, substantially as and for the purposes set forth.

3. In a harvester, the combination of a reel-bearing arm pivoted to a suitable support, so as to permit of the vertical adjustment of the reel, an adjusting-lever having suitable connections therewith and capable of turning on an axis transverse to its fulcrum, and a locking device arranged to hold the reel at a determinate point in its vertical movement and to be operated by the axial movement of said lever, substantially as and for the purposes set forth.

4. In a harvester, the combination of a suitable reel-support, a tubular reel-bearing arm pivoted to said support, and a spring inserted in said arm and having a bearing against said support a little below the pivotal connection of said arm therewith, substantially as and for the purposes set forth.

5. In a harvester-reel support, the combination of two supporting members pivoted at their lower ends to a fixed base, their upper ends joined to a coupling-piece by pivoted connections therewith, a reel-bearing arm pivoted to the coupling-piece, two sectors, one upon the upright and the other upon the reel-bearing arm, with locking mechanism held between said sectors and adapted to lock either one or both of them to the coupling-piece, an operating-lever pivoted on the reel-support, extending longitudinally toward the driver's seat, giving an axial motion to release the locking mechanism, and an up and down and forward and backward motion to adjust the position of the reel, substantially as set forth.

6. In a harvester-reel support, the combination of two supporting members pivoted at their lower ends to a fixed base-piece, their upper ends joined to a coupling-piece by pivotal connections therewith, a reel-bearing arm pivoted to said coupling-piece and support at their joint, and provided with a sector, concentric with its pivotal hinge, a locking mechanism coacting with said sector and coupling, and an operating-lever extending longitudinally backward toward the driver adapted to release the locking mechanism by an axial motion of said hand-lever and to adjust the reel upward and downward by a vertical motion of the hand-lever, substantially as described.

7. In a harvester-reel support, the combination of two supporting members pivoted at their lower ends to a fixed base-piece, their upper ends joined to a coupling-piece by a pivotal connection therewith, one of said supporting members provided with a sector, a locking mechanism to engage with said sector and coupling, a reel-bearing arm pivoted to said support, and means to hold the same in operating position, and an operating-lever adapted to engage said locking mechanism and to release the same by an axial movement of said lever, and to adjust the reel forward and backward on a nearly horizontal line by an endwise movement of the lever substantially as specified.

8. In a harvester-reel support, the combination of the arms C and D, pivoted at their lower ends to a fixed base-piece, their upper ends jointed to the coupling E, the reel-bearing arm F, made in tubular form, adapted to support the reel, the open spring K, placed within the tube of said arm, one end resting against the end of said tube, the other engaging the support below the pivot of the reel-bearing arm, adapted to balance the said arm and reel supported thereon in their vertical adjustment, substantially as set forth.

9. In a harvester-reel support, the combination of the arms C and D, pivoted at their lower ends to a fixed base-piece, their upper ends jointed to the coupling E, the reel-bearing arm F, made in tubular form to furnish a suitable receptacle for spring K, cup $K^2$ on rod K', engaging one end of the spring K, the other end resting against the end of the tube, and rod K', engaging the reel-support below the pivot of the reel-supporting arm adapted to support and to balance the reel in its vertical adjustment, substantially as specified.

10. In a harvester-reel support, the combination of the supporting-arm C and brace-arm D, having at its upper end the sector D', formed upon it and pivoted to the base-piece B, the coupling E, jointed to the upper ends of the supporting-arms, a locking-pin in the coupling-piece to engage with the sector D', a reel-supporting arm pivoted to said support, with means for controlling the same, and an operating-lever extending longitudinally toward the driver, adapted to operate the locking-pin by an axial motion of the lever, and to adjust the forward and backward movement of the reel by an endwise motion of the hand-lever, substantially as described.

11. The combination of the base-piece B, arms C and D, pivoted thereto, coupling E, jointed to said arms, the reel-bearing arm F, provided with its sector F', pivoted to the coupling E and support C, a locking-pin to engage said sector and coupling, an operating-lever pivoted to said coupling of the reel-support and extending longitudinally backward toward the driver, adapted to engage the locking-pin by an axial motion of said lever and to adjust the reel vertically by an upward and downward movement of said lever, substantially as set forth.

12. The combination of the base-piece B, supporting-arm C, brace-arm D, provided with its sector D', said arms pivoted at their lower ends to the base-piece, coupling E, connecting said arms at their upper ends, arm F, pivoted to the coupling and upright support, provided with its sector F', locking-pins adapted to unite said sectors with the coupling, and an operating-lever, pivoted to the coupling and extending longitudinally toward the driver, adapted to operate the locking-pins by an axial motion of the lever, and to adjust the reel, substantially as specified.

13. The combination of the supporting-arm C, the brace-arm D, provided with its sector D', pivoted at their lower ends to a fixed base, the coupling E, jointed to their upper ends, the reel-bearing arm F, provided with sector F', pivoted to arm C at its connection with the coupling locking-pins to unite the sectors and the coupling, and an operating-lever pivoted to the coupling of the support and extending backward toward the driver, adapted to operate the locking-pins by an axial motion of the hand-lever, and, by a properly-proportioned length of the arm C and D, to move the reel forward and backward in a nearly horizontal plane, substantially as specified.

14. In a reel-support for harvesters, the combination of the coupling E, lever H, pivoted thereon, provided with the plunger-pins I' I², located transverse to said lever, said plunger-pins held in operating position by the interposed spring $i$, two adjustment-sectors, with which the plunger-pins engage, with means for operating said pins in adjusting the reel, substantially as set forth.

15. In a harvester-reel support, the hand-lever H, provided with two transverse holding-pins or devices seated therein and with a longitudinal rod H² turning on its axis, and having releasing-fingers fastened thereon adapted to withdraw the locking-pins from adjacent sectors, substantially as set forth.

16. In a harvester-reel support, the hand-lever H, made of a cast piece to hold a locking device seated transversely therein, a wrought tubular extension from the same, and a longitudinal rod having a bearing within the tubular part, and adapted to operate the locking device by an axial motion, substantially as specified.

17. In a harvester-reel support, the combination of the plunger-pins I' I², provided with the lugs $i'$ $i'$ and $i^2$ $i^2$, with a recess between said lugs to receive the open coiled spring $i$, with a seat to hold the same, two adjustment-sectors, in which said plunger-pins engage, and an operating-lever provided with fingers or means adapted to withdraw the plunger-pins from the sectors and to adjust the position of the reel, substantially as described.

18. In a harvester-reel support, the reel-bearing arm F, its forward end having the transverse sleeve L' to support the reel-shaft, its rearward end branched to give a more secure fastening pivoted to its fellow member on a line parallel to the reel-shaft, the body of the arm formed tube-like open at the rear end adapted to support the reel and to provide a seat and end abutment for spring K, substantially as specified.

19. In a harvester-reel support, the combination of the base piece B, arm C, and brace-arm D, having the sector D', pivoted thereto at their lower ends, arm F, pivoted to arm C, and coupling E, its forward end adapted to bear the reel and its rearward end having the sector F', spring K, seated in arm F, the hand-lever pivoted to coupling E, its forward end connected to arm F by rod $h$, locking-pins I' and I², and spring $i$ to hold said pins in contact with the adjustment-sectors D' and F', and coupling E, the whole operating substantially as and for the purpose set forth.

JAMES A. GRAHAM.

Witnesses:
LINDLEY COLLINS,
W. H. HOWE.